United States Patent
Slovetskiy et al.

(10) Patent No.: US 11,516,263 B2
(45) Date of Patent: Nov. 29, 2022

(54) SECURE AND TRANSPARENT TRANSPORT OF APPLICATION LEVEL PROTOCOLS TO NON-IP DATA DELIVERY COMMUNICATION CHANNELS

(71) Applicant: T-Mobile USA, Inc., Bellevue, WA (US)

(72) Inventors: Sergey Slovetskiy, Bellevue, WA (US); Phani Ramisetty, Sammamish, WA (US); Cristian Asandului, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 162 days.

(21) Appl. No.: 16/745,222

(22) Filed: Jan. 16, 2020

(65) Prior Publication Data
US 2020/0296141 A1 Sep. 17, 2020

Related U.S. Application Data

(60) Provisional application No. 62/818,630, filed on Mar. 14, 2019.

(51) Int. Cl.
*H04L 65/1069* (2022.01)
*H04L 9/40* (2022.01)
*H04L 67/561* (2022.01)

(52) U.S. Cl.
CPC ...... *H04L 65/1069* (2013.01); *H04L 63/0428* (2013.01); *H04L 63/166* (2013.01); *H04L 67/561* (2022.05)

(58) Field of Classification Search
CPC ....... H04L 63/061; H04L 67/04; H04L 63/04; H04L 63/1458; H04W 12/04
See application file for complete search history.

(56) References Cited

U.S. PATENT DOCUMENTS

2009/0175294 A1* 7/2009 Orr .......................... H04L 12/18
370/463
2011/0289140 A1* 11/2011 Pletter ..................... H04L 67/10
709/203

(Continued)

FOREIGN PATENT DOCUMENTS

WO 2009029061 A1 3/2009

OTHER PUBLICATIONS

3rd Generation Partnership Project; Technical Specification Group Services and System Aspects; Architecture enhancements to facilitate communications with packet data networks and applications (Release 16). 3GPP TS 23.682v16.4.0, Sep. 2019, pp. 1-133 [online], [retrieved on Dec. 10, 2029]. Retrieved from the Internet URL: https://www.3gpp.org/ftp/Specs/archive/23_series/23.682.

(Continued)

*Primary Examiner* — Mahran Y Abu Roumi
(74) *Attorney, Agent, or Firm* — Han Santos, PLLC

(57) ABSTRACT

Techniques are described herein for transparently connecting to the same light weight machine-to-machine (LwM2M) server using both Internet Protocol (IP)-based and non-IP data delivery (NIDD)-based connectivity using all LwM2M functionality and security modes. The techniques include establishing a connection over a NIDD socket to communicate with an application server using NIDD binding to deliver a datagram destined for a target server. The datagram may be encapsulated in a serialized envelope including an application-level protocol metadata, wherein the metadata representing information corresponding to the target server. The datagram is delivered to the target server over NIDD-based transport.

20 Claims, 10 Drawing Sheets

(56) References Cited

U.S. PATENT DOCUMENTS

| | | | | |
|---|---|---|---|---|
| 2016/0212108 A1* | 7/2016 | Stojanovski | ............ | H04L 9/3247 |
| 2017/0149915 A1* | 5/2017 | Jolfaei | ................ | H04L 67/327 |
| 2020/0014762 A1* | 1/2020 | Li | ................... | H04W 60/04 |
| 2020/0028973 A1* | 1/2020 | Livanos | ............ | H04M 15/771 |
| 2020/0092275 A1* | 3/2020 | Seed | ................ | H04W 4/60 |
| 2020/0329013 A1* | 10/2020 | Zhou | ................ | H04W 76/11 |
| 2021/0058477 A1* | 2/2021 | Keranen | ............ | H04W 4/70 |

OTHER PUBLICATIONS

Berkeley sockets. Wikipedia, last edited Oct. 25, 2019, pp. 1-13 [online], [retrieved on Dec. 10, 2019 ]. Retrieved from the Internet URL: https://en.wikipedia.org/wiki/Berkeley_sockets.

C. Bormann et al. Concise Binary Object Representation (CBOR), IETF RFC 7049, Oct. 2013, pp. 1-54 [online], [retrieved on Dec. 10, 2019]. Retrieved from the Internet URL: https://tools.ietf.org/pdf/rfc7049.pdf.

E. Rescorla et al. Connection Identifiers for DTLS 1.2, draft-ietf-tls-dtls-connection-id-06, Jul. 8, 2019, pp. 1-15 [online], [retrieved on Dec. 10, 2019]. Retrieved from the Internet URL: https://tools.ietf.org/pdf/draft-ietf-tls-dtls-connection-id-06.pdf.

Furuhashi, S. (2008-2019). MessagePack [online], [retrieved on Dec. 10, 2019]. Retrieved from the Internet URL: https://msgpack.org/index.html.

Lightweight Machine to Machine Architecture. Open Mobile Alliance, Version 1.0, Feb. 8, 2017, pp. 1-12 [online], [retrieved on Dec. 10, 2019]. Retrieved from the Internet URL: http://openmobilealliance.org/release/LightweightM2M/V1_0-20170208-A/OMA-AD-LightweightM2M-V1_0-20170208-A.pdf.

Lightweight Machine to Machine Requirements. Open Mobile Alliance, Version 1.1, Jul. 10, 2018, pp. 1-31 [online], [retrieved on Dec. 10, 2019]. Retrieved from the Internet URL: http://openmobilealliance.org/release/LightweightM2M/v1_1-20180710-A/OMA-RD-LightweightM2M-V1_1-20180710-A.pdf.

T. Bray, et al. The JavaScript Object Notation (JSON) Data Interchange Format, IETF RFC 8259, Dec. 2017, pp. 1-16 [online], [retrieved on Dec. 10, 2019]. Retrieved from the Internet URL: https://tools.ietf.org/pdf/rfc8259.pdf.

Z. Shelby et al. The Constrained Application Protocol (CoAP), IETF RFC 7252, Jun. 2014, pp. 1-112 [online], [retrieved on Dec. 10, 2019]. Retrieved from the Internet URL: https://tools.ietf.org/pdf/rfc7252.pdf.

European Patent Application No. 20160278.6, Novelty Search dated Jul. 14, 2020, 7 pages.

European Patent Application No. 20160278.6, Office Action dated Feb. 16, 2022, 4 pages.

* cited by examiner

US 11,516,263 B2

SECURE AND TRANSPARENT TRANSPORT OF APPLICATION LEVEL PROTOCOLS TO NON-IP DATA DELIVERY COMMUNICATION CHANNELS

RELATED APPLICATION

This application claims priority to a commonly owned U.S. Provisional Patent Application No. 62/818,630 filed on Mar. 14, 2019, and titled "Secure and Transparent Transport of Application Level Protocols to Non-IP Data Delivery Communication Channels," which is herein incorporated by reference in its entirety.

BACKGROUND

Lightweight Machine-to-Machine (LwM2M) is a standard from the Open Mobile Alliance (OMA) that is focused on constrained cellular and other M2M devices. The standard devices implement an efficient client-server interface based on the open Internet Engineering Task Force (IETF) standards such as Datagram Transport Layer Security (DTLS) and Constrained Application Protocol (CoAP). Even though the transport binding to non-Internet Protocol (IP) data delivery (NIDD) has been defined in the LwM2M 1.1 specification, there is a number of gaps not allowing full LwM2M functionality to work over NIDD. Consequentially, it is not possible for the LwM2M client to transparently switch between IP-based transport and NIDD-based transport to communicate with the same LwM2M server while using the same security modes.

Standardization does not define DTLS and CoAP bindings to the NIDD-based transport. Instead, only unsecured LwM2M binding to the NIDD-based transport is defined. Only unencrypted communication over NIDD using the noSEC security mode is currently possible with LwM2M 1.1. Thus, bootstrapping and other operations using any security bindings mapped to DTLS (i.e., Pre-Shared Secret Keys [PSK], Raw Public Keys [RPK], and X.509 certificates) are not possible via NIDD.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
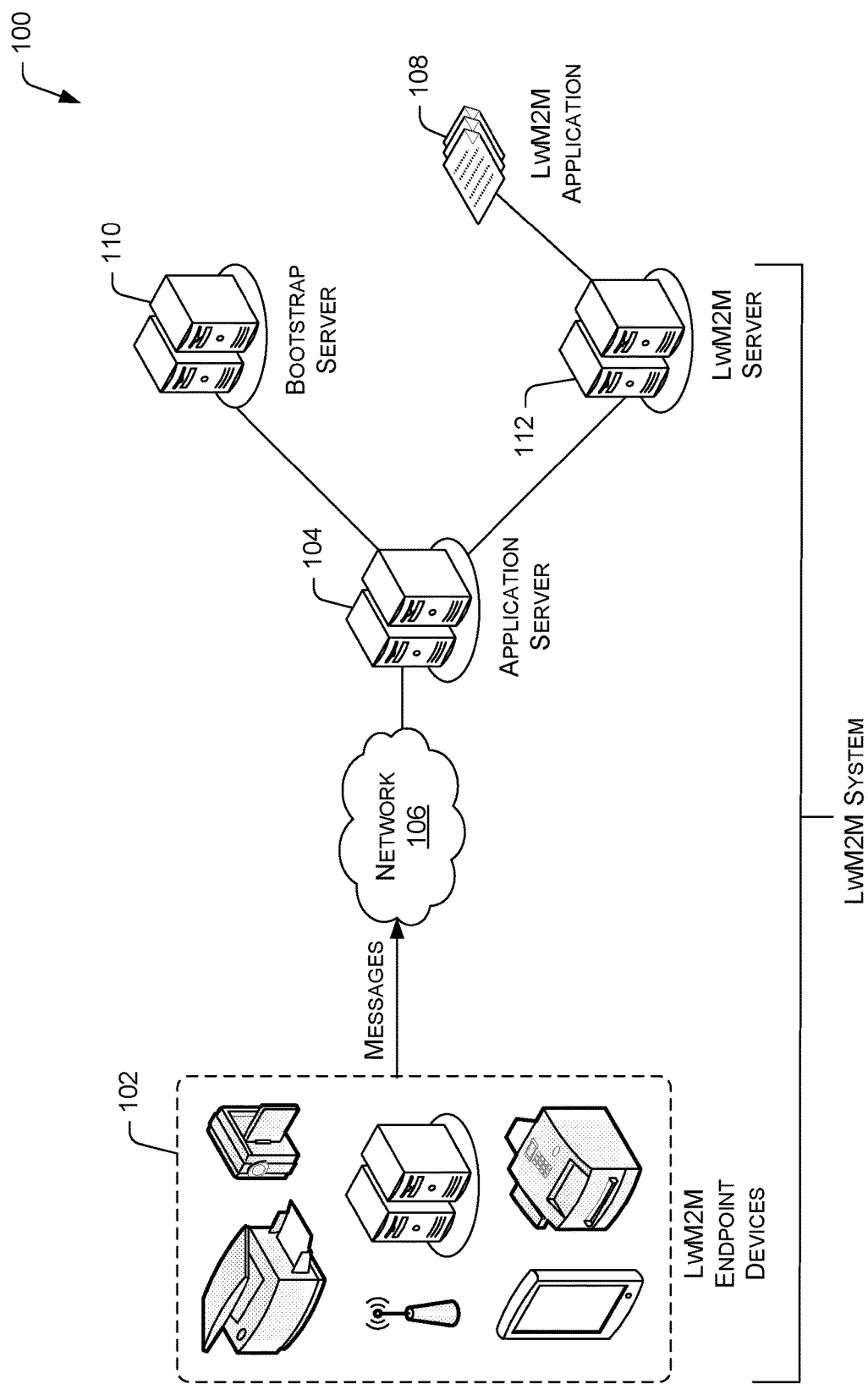
FIG. 1 illustrates an example of network architecture for using LwM2M protocol transparently via both IP-based and non-IP-based (NIDD) connection.

This disclosure is directed to techniques for providing transparent LwM2M operations over non-IP data delivery, in which an LwM2M client may transparently connect to the same LwM2M server alternatively or concurrently via both IP-based and NIDD-based connectivity using all LwM2M functionality and security modes, including client- or server-initiated bootstrapping.

LwM2M protocol uses an endpoint identifier (ID) to identify a specific client and then uses the client's incoming IP-address:Port-number combination to uniquely identify the LwM2M client or LwM2M server. In the CoAP protocol (RFC 7252), which underlies the LwM2M protocol, the client endpoint is solely identified by the IP address and User Datagram Protocol (UDP) port number. DTLS-based security modes are derived from the security context, which is also based on the IP-address:Port-number combination mapped to the specific credential or a credential ID (e.g., PSK-id) that is negotiated during the DTLS handshake and key exchange procedures.

In some aspects a UDP socket wrapper layer is introduced between the UDP and NIDD interfaces and LwM2M client. The UDP socket wrapper encapsulates the underlying regular UDP socket for connecting over the IP transport, and new NIDD socket implementing a device-specific connectivity layer to the NIDD data connection. The NIDD socket may be an extension of the socket Application Programming Interface (API) to send data to the NIDD connection (e.g., encoding the data stream and sending it to the related interface over AT-command interface). The UDP socket wrapper may present the two underlying sockets to DTLS layer as a regular UDP socket.

In some aspects the UDP socket wrapper includes a connection router layer, which may define whether to use UDP or NIDD connection. In one example, the connection router layer may implement a policy module that can randomly try interfaces or based at least on one or more conditions. For instance, the connection router module may use both IP-based and NIDD connections simultaneously or sequentially. Additionally, the connection router layer may implement an encapsulation layer to insert NIDD metadata for LwM2M routing into the data stream. For example, uri-host and uri-port options or CoAP/LwM2M endpoint client-IP parameter (ep), or other identifiable data may be inserted in the CoAP packet.

The UDP socket wrapper may also be deployed as a separate device or an operating system (OS) stack layer. In this case, the functionality may be transparent to the upper layer client, and the protocol or connection type exposed to an LwM2M client may be represented as the UDP. Parameter update of connectivity object may be provided to determine the underlying switching between IP and non-IP based transports. In this case, the wrapping layer emulates all standard UDP parameters that may be returned by the UDP-type networking socket.

In some aspects the NIDD interface implements an additional datagram wrapper layer, passing to the server necessary metadata to route encrypted datagrams on the server-side. The NIDD metadata that is sent in the NIDD frame is unparsed on the server-side to recover the metadata information (e.g., uri-host, uri-port, ep, etc.). The NIDD metadata is used to identify the uri-host and uri-port combination of a particular target LwM2M server, bootstrap server, CoAP server, and/or so forth. Thus, the NIDD metadata is used to route the datagram to an appropriate server.

The techniques described herein may be implemented in a number of ways. Example implementations are provided below with reference to the following figures.

Example Network Architecture

FIG. 1 illustrates example architecture for using LwM2M protocol transparently via both IP-based and non-IP-based (NIDD) connections. The architecture 100 may include one or more LwM2M endpoint devices 102 that may interface with an application server 104 over a network 106. The network 106 can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), and/or a collection of networks (e.g., the Internet). The network 106 can also be based on a low-power or short-range wireless communication (e.g., WiFi, Bluetooth, etc.) as opposed to radio communication over more extended distances such as in macrocells of a cellular network. The network 106 can implement both IP-based and non-IP-based (NIDD) transport.

The application server 104 may be hosted by an M2M service provider, network service provider, or application service provider. The application server 104 may include general-purpose computers, such as desktop computers, tablet computers, laptop computers, servers (e.g., on-premise servers), or other electronic devices that are capable of receiving input, processing the input, and generating output data. The application server 104 may store data in a distributed storage system, in which data may be stored for long periods of time and replicated to guarantee reliability.

The application server 104 may provide data and processing redundancy, in which data processing and data storage may be scaled in response to demand. Further, in a networked deployment, new application servers may be added. Thus, the application server 104 can include a plurality of physical machines that may be grouped together and presented as a single computing system. Each physical machine of the plurality of physical machines may comprise a node in a cluster. The application server 104 may also be in the form of virtual machines, such as virtual engines (VE) and virtual private servers (VPS).

The LwM2M endpoint devices 102 may also include general-purpose computers and other electronic devices having a wireless communication function that can receive input, process the input, and generate output data. In various embodiments, the LwM2M endpoint devices 102 may include home automation devices, appliances, transportation devices, healthcare devices, Internet of Things (IoT) devices, phones, tablets, mobile devices, and other devices that can communicate over short- or long-range technologies.

Communication between the LwM2M endpoint devices 102 and the application server 104 is provided as a client-server type of communication, where the LwM2M endpoint device 102 has data to report and acts as a client entity. Thus, the LwM2M endpoint device 102 may be referred to as a client device. In some embodiments, the application server 104 may communicate with multiple clients. The communication types supported by the client/server may include UDP/IP based communication type. The UDP/IP based communication type is suitable for remote data exchange with metering equipment via IP enabled networks, using various communication networks such as LAN or private or public WAN. The communication type may also include a non-IP communication type. The non-IP based communication type is suitable for use of protocols that have been optimized for a specific use and power consumption can be optimized using non-IP. While the illustrated embodiment shows two network connectivity interfaces—IP and NIDD, any number and type of supported interfaces may be implemented.

Generally, the following logical interfaces are defined between the application server 104 and the client: bootstrapping being pre-provisioned or client or server-initiated, registration to register the client and its objects, object or resource access or device management to enable the application server 104 to access an object or resource, and information reporting for notifications with new resource values.

Figure 2:
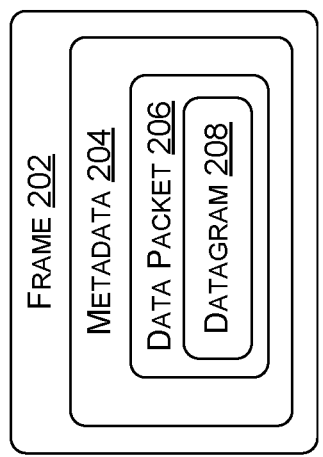
FIG. 2 is a block diagram showing various components of a protocol data unit.

The application server 104 can be a CoAP server, MQ Telemetry Transport for Sensor Networks (MQTT-SN) server, an LwM2M server, a bootstrap server, and/or Service Capability Server (SCS) as defined by 3GPP. Additionally, or alternatively, the application server 104 can include an intermediary server or an intermediate node in communication with additional servers (e.g., bootstrap server 110, LwM2M server 112, etc.). The application server 104 may receive a data packet from an LwM2M endpoint device (i.e., a client device) 102. The data packet may be destined for network services or an LwM2M application 108 operating on the application server 104 or other servers (e.g., bootstrap server 110, LwM2M server 112, etc.). Various components of a protocol data unit are depicted in FIG. 2. As shown in FIG. 2, a datagram 208 sits inside a data packet 206, which is wrapped in a frame 202. In some aspects, the metadata 204 is pre-pended to correctly route the datagram 208 which is passed down to the next layer (i.e., data link layer).

Example Computing Device Components

Figure 3:
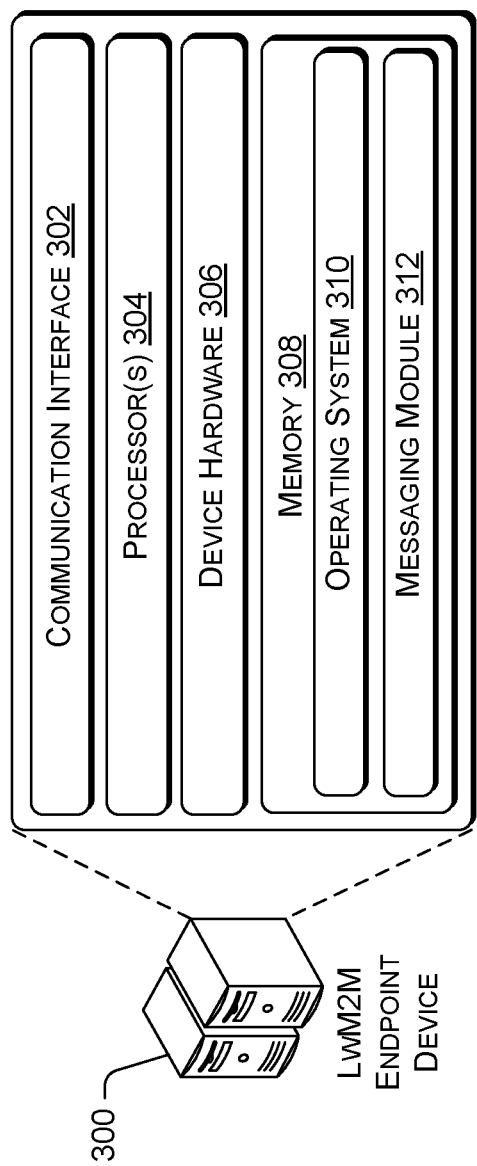
FIG. 3 is a block diagram showing various components of an illustrative LwM2M endpoint device.

FIG. 3 is a block diagram showing various components of an LwM2M endpoint device 300 that hosts a client. It is noted that the LwM2M endpoint device 300 as described herein can operate with more or fewer of the components shown herein. Additionally, the LwM2M endpoint device 300 as shown herein or portions thereof can serve as a representation of one or more of the client devices of the present system.

The LwM2M endpoint device 300 may include a communication interface 302, one or more processors 304, hardware 306, and memory 308. The client entity hosted on the LwM2M endpoint device 300 can support multiple communication types (i.e., IP/non-IP based communication). The communication interface 302 may include wireless and/or wired communication components that enable the LwM2M endpoint device 300 to transmit data to and receive data from other networked devices. In at least one example, the one or more processor(s) 304 may be a central processing unit(s) (CPU), graphics processing unit(s) (GPU), both a CPU and GPU or any other sort of processing unit(s). Each of the one or more processor(s) 304 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 304 may also be responsible for executing all computer applications stored in the memory, which can be associated with common types of volatile (RAM) and/or nonvolatile (ROM) memory. The hardware 306 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 308 may also include a firewall. In some embodiments, the firewall may be implemented as hardware 306 in the LwM2M endpoint device 300.

The processors 304 and the memory 308 of the LwM2M endpoint device 300 may implement an operating system 310 and a messaging module 312. The operating system 310 may include components that enable the LwM2M endpoint device 300 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The messaging module 312 may include routines, program instructions, objects, and/or data structures that perform particular tasks or implement particular abstract data types. For example, the messaging module 312 may include one or more instructions, which when executed by the one or more processors 304 direct the LwM2M endpoint device 300 to perform operations related to transmitting application-level protocol (e.g., LwM2M/CoAP) messages. In one aspect, the messaging module 312 is configured to transmit a data packet that is destined for network services or an LwM2M application operating on the application server or other servers (e.g., bootstrap server, LwM2M server, etc.). The messaging module 312 may be configured to transport messages using DTLS-based PSK, RPK, and X.509 security modes over NIDD.

Figure 4:
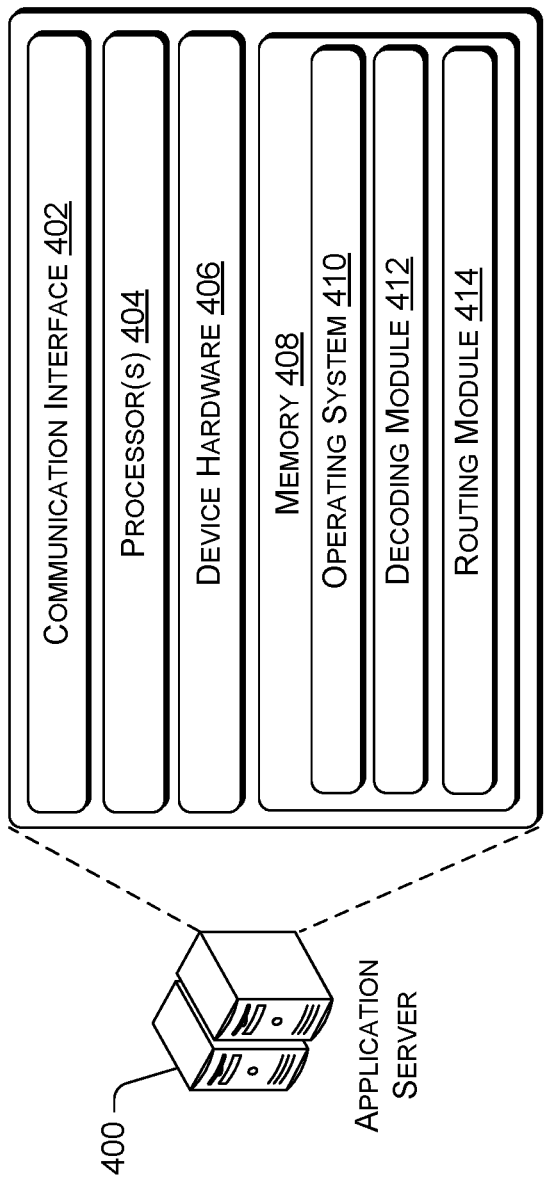
FIG. 4 is a block diagram showing various components of an illustrative application server (AS).

FIG. 4 is a block diagram showing various components of an application server 400. It is noted that the application server 400 as described herein can operate with more or fewer of the components shown herein. Additionally, the application server 400 as shown herein or portions thereof can serve as a representation of one or more of the servers of the present system.

The application server 400 may include a communication interface 402, one or more processors 404, hardware 406, and memory 408. The communication interface 402 may include wireless and/or wired communication components that enable the application server 400 to transmit data to and receive data from other networked devices. In at least one example, the one or more processor(s) 404 may be a central processing unit(s) (CPU), graphics processing unit(s) (GPU), both a CPU and GPU or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the application server 400.

The processors 404 and the memory 408 of the application server 400 may implement an operating system 410, a decoding module 412, and a routing module 414. The operating system 410 may include components that enable the application server 400 to receive and transmit data via various interfaces (e.g., user controls, communication interface, and/or memory input/output devices), as well as process data using the processors 404 to generate output. The operating system 410 may include a presentation component that presents the output (e.g., display the data on an electronic display, store the data in memory, transmit the data to another electronic device, etc.). Additionally, the operating system 410 may include other components that perform various additional functions generally associated with an operating system.

The decoding module 412 and the routing module 414 may include routines, program instructions, objects, and/or data structures that perform particular tasks or implement particular abstract data types. For example, the decoding module 412 may include one or more instructions which, when executed by the one or more processors 404, direct the application server 300 to perform operations relating to un-parsing NIDD metadata in the NIDD frame. The decoding module 412 recovers the metadata information (e.g., uri-host, uri-port, ep, etc.) which is sufficient to identify the uri-host and uri-port combination of a particular target LwM2M, bootstrap, or CoAP server, recover the endpoint-id of a particular LwM2M client if not already identified by the external-ID or MSISDN, and route the datagram to an appropriate server.

The decoding module 412 passes the metadata to the routing module 414. The routing module 414 may include one or more instructions which, when executed by the one or more processors 404, direct the application server 400 to perform operations related to mapping or routing application-level protocol messages (e.g., encrypted DTLS messages) or datagrams to an appropriate server (e.g., LwM2M, CoAP, bootstrap server). The routing module 414 may route the messages or datagrams based at least on metadata such as ep, source port, uri-host, or uri-port options.

Protocol Stacks

Figure 5:
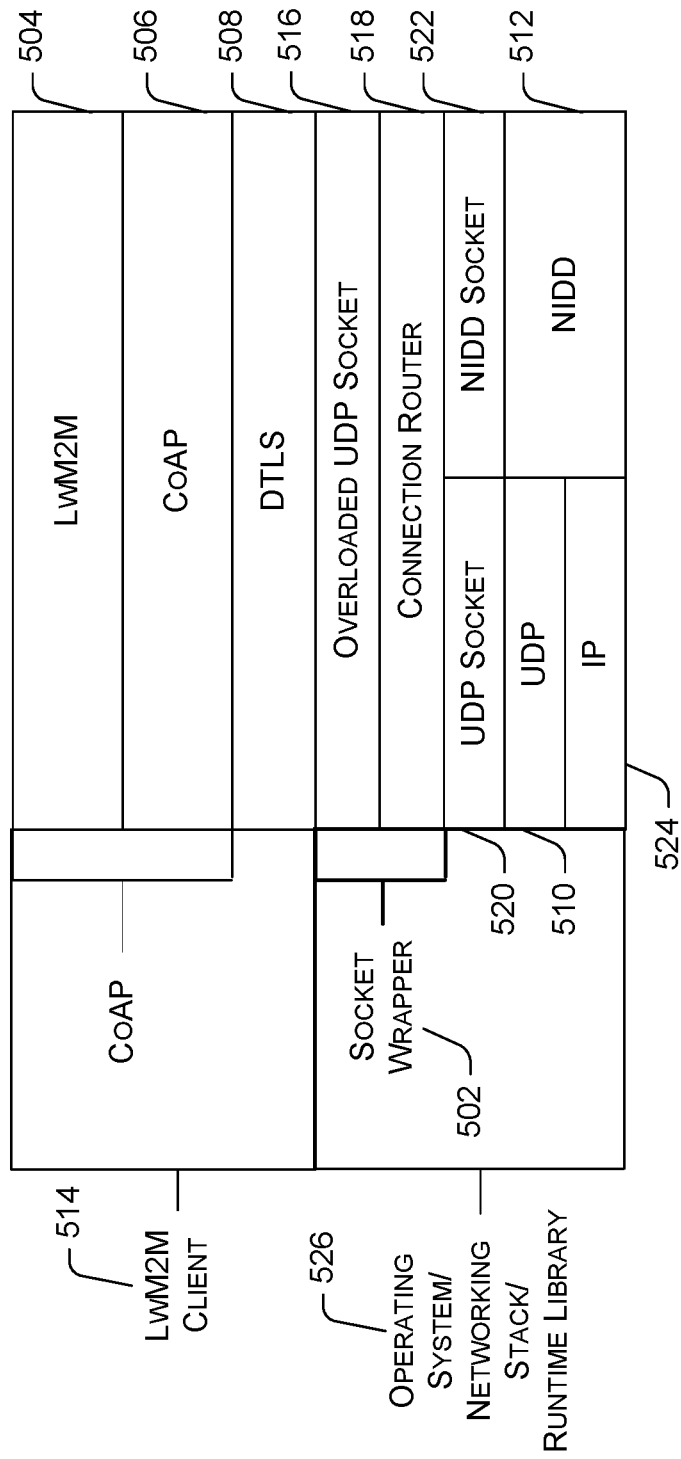
FIG. 5 is a protocol model that includes a UDP socket wrapper layer.

FIG. 5 is a protocol model that includes a UDP socket wrapper layer 502. In some aspects, an application server is in communication with a client using both IP-based and NIDD-based connectivity.

The LwM2M protocol stack 504 uses CoAP 506 as the underlying transfer protocol over UDP. CoAP 506 defines the message header, request/response codes, message options, and retransmission mechanisms. CoAP 506 is an alternative to HyperText Transfer Protocol (HTTP) for Representational State Transfer (RESTful) APIs on devices and supports the methods of GET, POST, PUT, DELETE, which can be mapped to those of HTTP. Unlike HTTP, CoAP messages are exchanged asynchronously between CoAP endpoints over a datagram-oriented transport such as UDP. CoAP messages are encoded in a binary format allowing functionality to start with a 4-byte overhead.

The LwM2M architecture uses security protocols to secure communications between client and server using DTLS 508. DTLS 508 is used to provide a secure channel between an LwM2M server and an LwM2M client for all efficient payloads. The efficient payloads can be a plain text for individual resources and binary TLV or JSON for resource batches (object or resource arrays). DTLS security modes include both pre-shared key and public key technology to support embedded devices.

The UDP socket wrapper layer 502 is introduced between the UDP 510 and NIDD interfaces 512 and LwM2M client 514. The UDP socket wrapper layer 502 includes an overloaded UDP socket 516 and a connection router 518. The UDP socket wrapper layer 502 encapsulates the underlying regular UDP socket 520 for connecting over the IP transport 524, and a NIDD socket 522 implementing device-specific connectivity layer to the NIDD data connection 512, for example, by encoding the data packets as base64 and sending them to the communication module over AT commands. The UDP socket wrapper layer 502 may be a functionality extender exposing new parameters and methods. In one aspect, the UDP socket wrapper layer 502 may add a new socket transport protocol/type parameter, e.g., Hybrid UDP (HUDP). The UDP socket wrapper layer 502 may also completely hide the UDP 510 and NIDD interfaces 512 using standard sockets interface to datagram transport, e.g., UDP.

The UDP socket wrapper layer 502 may be deployed as a separate device or operating system stack layer 526, not as code as part of the software client. In this case, the functionality will be completely transparent to the upper layer client, and the client will have no knowledge about the underlying switching between IP 524 and non-IP based (e.g., NIDD 512) transports. In the completely transparent deployment option, the protocol/connection type exposed to the LwM2M client (either 1.0 or 1.1) may be represented as UDP. In this case, the UDP socket wrapper layer emulates all standard UDP parameters that may be returned by the UDP-type networking socket. To determine whether the client is currently connecting over NIDD or UDP/IP, the parameter update of a connectivity object may be provided.

The connection router 518 may parse the incoming data stream and provide logic to route over either IP-based or NIDD-based connectivity. The routing may be generally implemented using a policy module. The policy module may use logic to try IP-based or non-IP based interfaces randomly or sequentially. Additionally, or alternatively, the policy module may attempt to connect to IP-based or non-IP based interfaces concurrently. In some aspects, the policy module may be rule-based. For example, the policy module may allow specific LwM2M operations only over IP (e.g., SOTA/FOTA).

The connection router 518 also implements an encapsulation layer to insert NIDD metadata in the NIDD frame that can be unparsed on the server-side to correctly define the DTLS security context on both sides of the NIDD connection, and to correctly route the data (e.g., DTLS-encrypted or unencrypted CoAP underlying LwM2M) to a specific server such as LwM2M, bootstrap, or CoAP server. Typically, the minimal necessary combination in the IP-based protocols is to define two tuples: source IP-address:UDP port and destination IP-address:UDP port to define the connection endpoints. To be able to signal this information outside of the encrypted DTLS datagrams, these parameters are mapped to a set of metadata values to be pre-pended to each datagram and serialized. Any serialization format (e.g., JSON, CBOR, etc.) may be implemented. In a serialized form, an additional element for mapping metadata is pre-pended to the byte payload, which may include an encrypted DTLS datagram.

In one aspect, new parameter mapping to UDP source-port can be defined as a new CoAP option. Either could be modeled after the TCP/UDP ephemeral ports from the same range, or a new range could be defined, e.g., 0,1,2, etc. For example, the data may be routed based at least on uri-host and uri-port options. Additionally, for further extensions, any CoAP-level option specified by the enumerated key and any CoAP query parameter specified by string key may be added to the metadata.

In some aspects, the CoAP/LwM2M endpoint client-IP (i.e., ep) parameter may be inserted as metadata using simple framing. However, values corresponding to ep may be omitted if the originator is completely determined on the NIDD level by, for example, external-ID, MSISDN, and/or other identifiers. Similarly, the source port may be omitted if there is only one client application endpoint for each NIDD connection.

Figure 6:
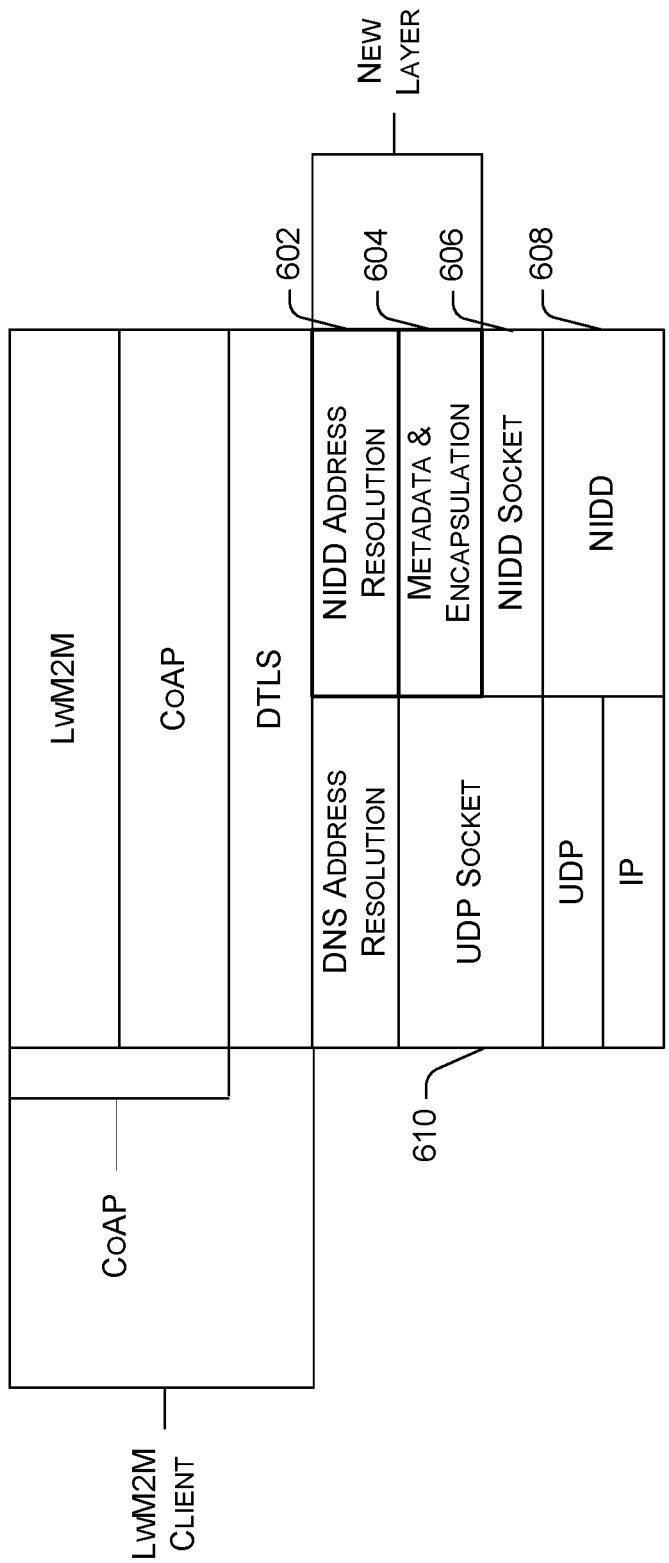
FIG. 6 is a protocol model that includes new layers for the NIDD Socket binding.

FIG. 6 is a client-side protocol model that includes new layers for the NIDD Socket binding. In the illustrated embodiment, the protocol model includes a new layer comprising a NIDD address resolution layer 602 and a metadata and encapsulation layer 604 that uses a new NIDD socket 606. When a client initiates bootstrapping over NIDD interface 608, security binding may be needed for the proper bootstrap. During deployment, the client may send the bootstrap message by writing to the NIDD socket 606 in the same way as to the UDP socket 610. During NIDD socket implementation, the NIDD address resolution layer 602 may use the same address semantics as the domain name system (DNS) address resolution, but to resolve to the address, NIDD semantics can be used for the security context of the DTLS session. The NIDD socket 606 accepts the DTLS messages starting from the Handshake (ClientHello). The metadata and encapsulation layer 604 then wraps the DTLS messages into the metadata and passes to the NIDD 608 as a datagram.

Figure 7:
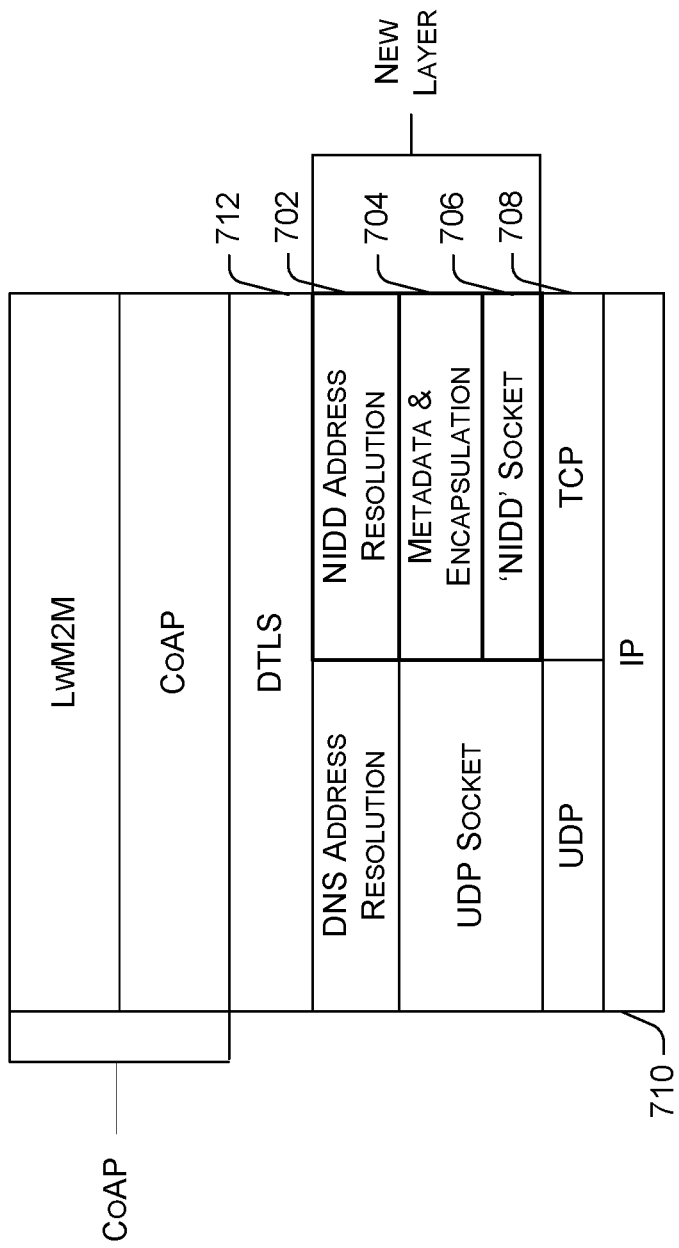
FIG. 7 is a server-side protocol stack for processing NIDD messages.

FIG. 7 is a server-side protocol stack. It is assumed that the standard NIDD server-side termination procedures has been implemented using, for example, 3GPP-defined architecture (e.g., using Service Capability Exposure Function (SCEF)), and the NIDD raw payload has been forwarded over any IP-based transport (e.g., RESTful API) to the application server. In the illustrated embodiment, the protocol model includes a new layer comprising a NIDD address resolution layer 702 and a metadata and encapsulation layer 704 that uses a specialized 'NIDD' socket 706. The networking traffic uses TCP interface 708 or IP interface 710 to deliver encapsulated messages comprising metadata. Therefore, there is a need to overload (extend) the IP socket with the specialized 'NIDD' socket 706. The 'NIDD' socket 706 may be a listening socket. Listening sockets can derive the origin TCP IP:port from incoming traffic. The 'NIDD' socket 706 may include the functions to decode incoming CBOR, extract metadata to be used for the security context, and pass the encrypted DTLS records to the DTLS layer 712. Similar to the client-side processing, the 'NIDD' socket 706 overloads the socket API, and handles address resolution and framing within the socket separately for the traffic destined to the NIDD as opposed to for the IP-based traffic. Additionally, the new layer may need the IP level configuration to route the message correctly to the intermediate nodes (e.g., application server) handling the NIDD conversion. This may be accomplished by concatenating the intermediate node name, address, or configuration to the device endpoint-ID for sending, for example, as.system.com/device-id, wherein the device-id could be any identifier that the intermediate application server may recognize (e.g., NB-IoT external-ID, MSISDN, CoAP/LwM2M endpoint-ID, or any combination thereof).

In one example, during deployment, an application server may receive, from a client device, a T8 NIDD API message with the data field containing the datagram in a T8 interface call (e.g., RESTful HTTP request). The message may include a device identifier corresponding to the client device. The device identifier may be provided in the external-ID or MSISDN field of the T8 interface as defined by 3GPP TS 29122. The external-ID or MSISDN may be used to map the communication to a target server (e.g., LwM2M, bootstrap, or CoAP server). If the application server cannot map the message based at least on the external-ID or MSISDN, the application server may consider data in the data field as a CBOR serialization and decode it. In turn, the application server may recover metadata such as uri-host, uri-port, and/or ep:endpoint-ID field in the wrapper to route the datagram to a particular server. The uri-host and uri-port combination may be used to identify the target LwM2M, bootstrap, or CoAP server. Additionally, the ep:endpoint-ID may be used to identify a particular LwM2M client if it is not already identified by the external-ID or MSISDN. Depending on the implementation, the target server may need the metadata information to create a security context. In this scenario, the datagram is forwarded in the CBOR envelope, or the metadata is passed in a separate data field. The target server then passes the datagram to the DTLS stack using the metadata to create a security context for the datagram.

Example Processes

Figure 8:
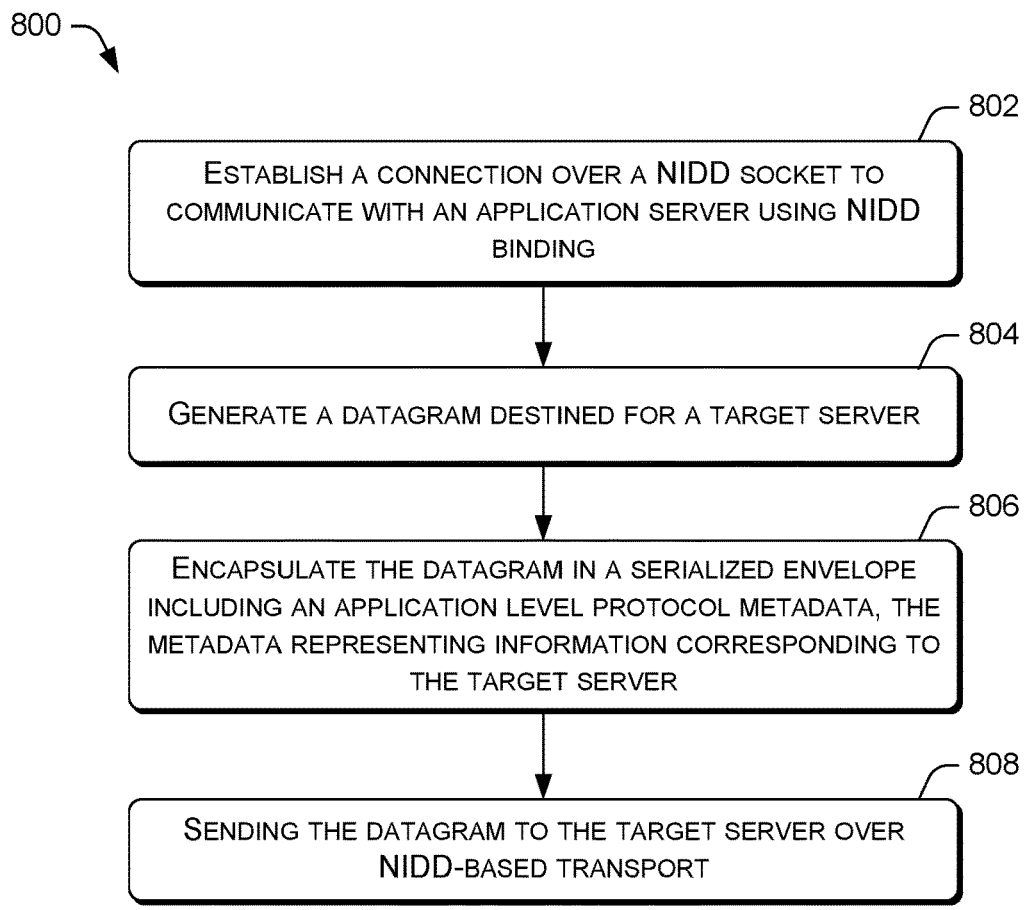
FIG. 8 is a flow diagram of an example process for transporting application-level protocol messages modeled over IP transport, using DTLS security modes over NIDD.
Figure 9:
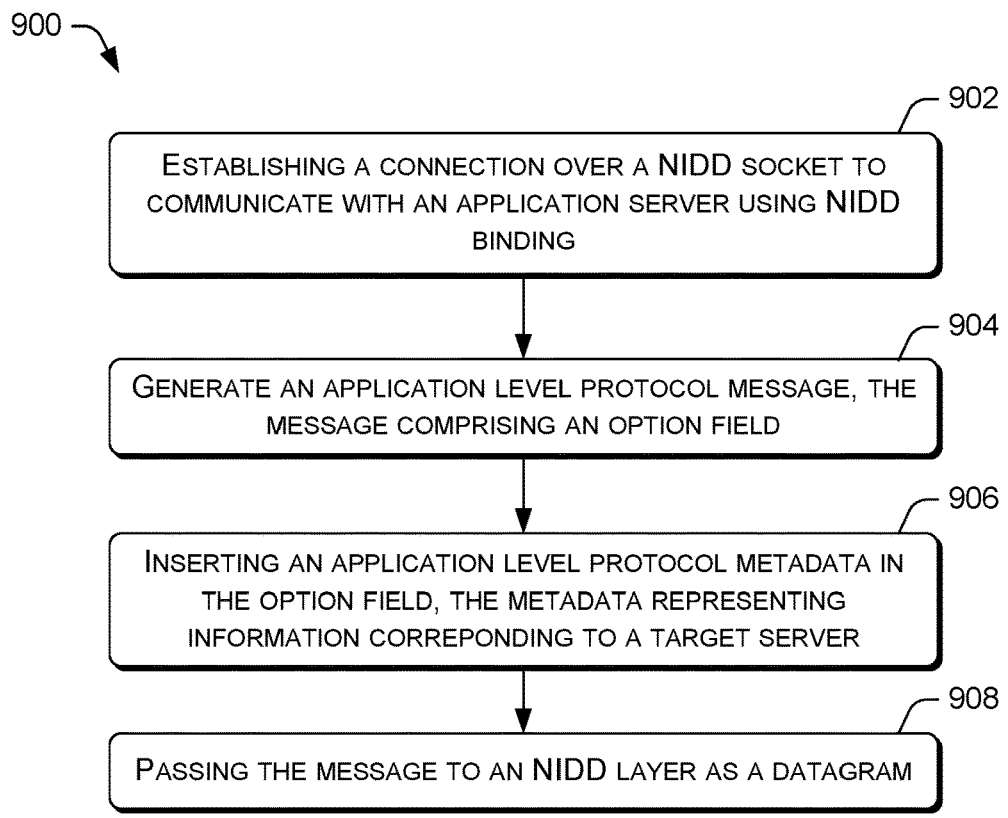
FIG. 9 is a flow diagram of an example process for inserting metadata into an option field of a data layer.
Figure 10:
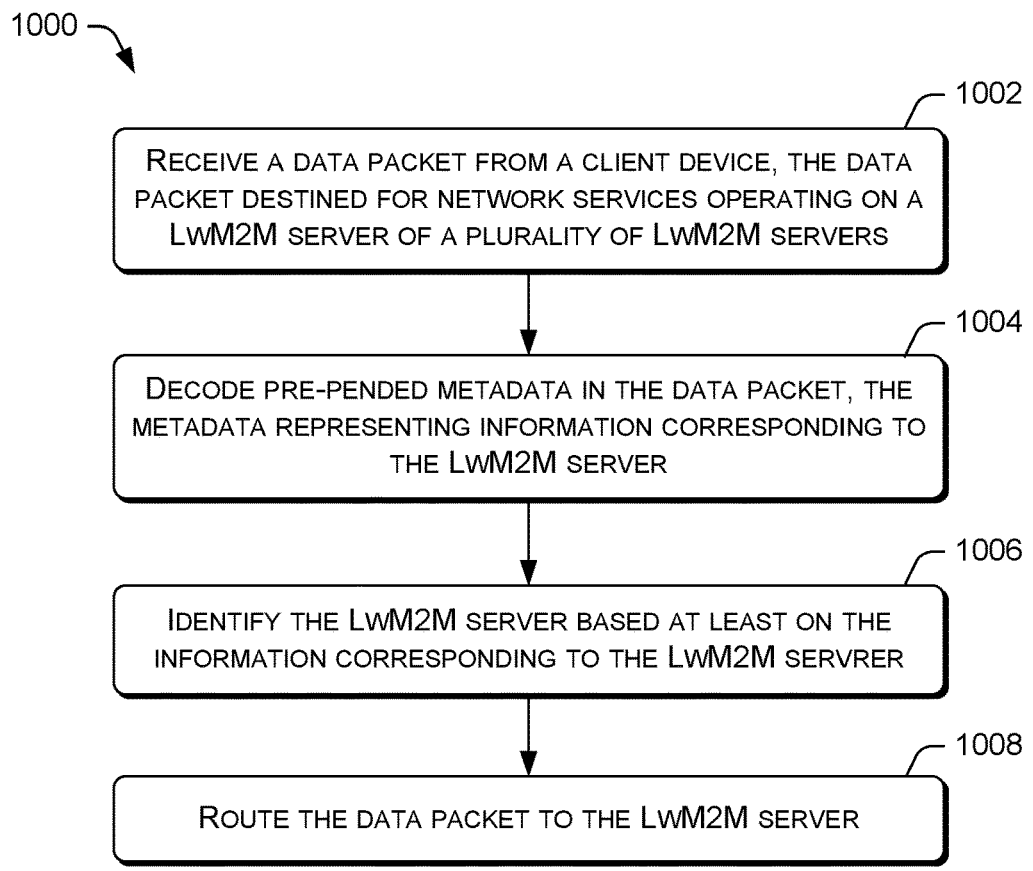
FIG. 10 is a flow diagram of an example process for decoding pre-pended metadata in a data packet to route the data packet to an appropriate application server.

FIGS. 8-10 presents illustrative processes 800-1000 for transporting application-level protocol messages modeled over IP transport, using DTLS security modes over NIDD. The processes 800-1000 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800-1000 are described with references to FIGS. 1-7.

FIG. 8 is a flow diagram of an example process for transporting application-level protocol messages modeled over IP transport, in some cases using DTLS security modes over NIDD. Various protocols may be used, depending upon embodiments. For example, CoAP, LwM2M protocol, MQ Telemetry Transport for Sensor Networks (MQTT-SN) protocol, and/or Quick User Datagram Protocol Internet Connections (QUIC) protocol may be implemented. At block 802, a client device establishes a connection over a NIDD socket to communicate with an application server using NIDD binding. The NIDD socket may be a listening socket. At block 804, the client device generates a datagram destined for a target server. The datagram may be encrypted or may be an unencrypted application protocol data. In some aspects, the datagram is generated when the DTLS handshake process has been completed. At block 806, the client device encapsulates the datagram in a serialized envelope including application-level protocol metadata, the metadata representing information corresponding to the target server. Various serializing format for the serialized envelop such as JSON and CBOR may be used. At block 808, the client device sends the datagram to the target server over NIDD-based transport.

FIG. 9 is a flow diagram of an example process for inserting metadata into an option field of a data layer. At block 902, a client device establishes a connection over a NIDD socket to communicate with an application server using NIDD binding. At block 904, the client device generates an application-level protocol message, the message comprising an option field. The option field can comprise a connection identifier field of encrypted DTLS packets. At block 906, the client device inserts application-level protocol metadata in the option field, the metadata representing information corresponding to a target server. The target server comprises at least one of the CoAP server, MQTT-SN server, an LwM2M server, and/or a bootstrap server. At block 908, the client device passes the message to a NIDD layer as a datagram, wherein the datagram can comprise DTLS encrypted data or an unencrypted application protocol data.

FIG. 10 is a flow diagram of an example process for decoding pre-pended metadata in a data packet to route the data packet to an appropriate application server, wherein the data packet may be encrypted. At block 1002, an application server receives a data packet from a client device, the data packet destined for network services operating on an LwM2M server of a plurality of LwM2M servers. The network services may comprise one or more services that communicate with the client devices using UDP. At block 1004, the application server decodes pre-pended metadata in the data packet, the metadata representing information corresponding to the LwM2M server. In various embodiments, the metadata may be encapsulated. Additionally, the metadata may comprise an endpoint identifier, a connection identifier, uri-host and uri-port, and/or so forth. At block 1006, the application server identifies the LwM2M server based at least on the information corresponding to the LwM2M server. At block 1008, the application server routes the data packet to the LwM2M server.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
    establishing, by a computing device, a connection over a Non-Internet Protocol Data Delivery (NIDD) socket to communicate with an application server using NIDD binding;
    generating, by the computing device, a datagram destined for a target server;
    determining, by the computing device, a destination address and port of the target server and a source address and port of the computing device;
    during a Datagram Transport Layer Security (DTLS) handshake process, mapping, by the computing device, the destination address and port and the source address and port to metadata of an application level protocol;
    combining the metadata and the datagram;
    serializing, by the computing device, the combined metadata and datagram according to a serialization format; and
    sending, by the computing device, the serialized, combined metadata and datagram to the target server over NIDD-based transport.

2. The one or more non-transitory computer-readable media of claim 1, wherein the acts further comprise:
    wrapping the NIDD socket in a wrapper socket to emulate handling of Internet Protocol (IP)-based transport.

3. The one or more non-transitory computer-readable media of claim 1, wherein the datagram is an encrypted datagram generated when the DTLS handshake process has been completed.

4. The one or more non-transitory computer-readable media of claim 1, wherein the datagram is an unencrypted application protocol data.

5. The one or more non-transitory computer-readable media of claim 1, wherein the application-level protocol comprises at least one of Constrained Application Protocol (CoAP), light weight machine-to-machine (LwM2M) protocol, MQ Telemetry Transport for Sensor Networks (MQTT-SN) protocol, and Quick User Datagram Protocol Internet Connections (QUIC) protocol.

6. The one or more non-transitory computer-readable media of claim 1, wherein a serializing format for the serialized envelop is Concise Binary Object Representation (CBOR).

7. The one or more non-transitory computer-readable media of claim 1, wherein the NIDD socket is a listening socket.

8. A system, comprising:
    one or more non-transitory storage mediums configured to provide stored computer-readable instructions, the one or more non-transitory storage mediums coupled to one or more processors, the one or more processors configured to execute the computer-readable instructions to cause the one or more processors to:
        establish, by a computing device, a connection over a Non-Internet Protocol Data Delivery (NIDD) socket to communicate with an application server using NIDD binding;
        generate, by the computing device, a datagram destined for a target server;
        determine, by the computing device, a destination address and port of the target server and a source address and port of the computing device;
        during a Datagram Transport Layer Security (DTLS) handshake process, map, by the computing device, the destination address and port and the source address and port to metadata of an application level protocol;
        combine the metadata and the datagram;
        serialize, by the computing device, the combined metadata and datagram according to a serialization format; and
        send, by the computing device, the serialized, combined metadata and datagram to the target server over NIDD-based transport.

9. The system of claim 8, wherein the computer-readable instructions to cause the one or more processors to:
    wrap the NIDD socket in a wrapper socket to emulate handling of Internet Protocol (IP)-based transport.

10. The system of claim 8, wherein the datagram is an encrypted datagram generated when the DTLS handshake process has been completed.

11. The system of claim 8, wherein the datagram is an unencrypted application protocol data.

12. The system of claim 8, wherein the application-level protocol comprises at least one of Constrained Application Protocol (CoAP), light weight machine-to-machine (LwM2M) protocol, MQ Telemetry Transport for Sensor Networks (MQTT-SN) protocol, and Quick User Datagram Protocol Internet Connections (QUIC) protocol.

13. The system of claim 8, wherein a serializing format for the serialized envelop is at least one of JavaScript Object Notation (JSON) and Concise Binary Object Representation (CBOR).

14. The system of claim 8, wherein the NIDD socket is a listening socket.

15. A computer-implemented method, comprising:
establishing, by a computing device, a connection over a Non-Internet Protocol Data Delivery (NIDD) socket to communicate with an application server using NIDD binding;
generating, by the computing device, a datagram destined for a target server;
determining, by the computing device, a destination address and port of the target server and a source address and port of the computing device;
during a Datagram Transport Layer Security (DTLS) handshake process, mapping, by the computing device, the destination address and port and the source address and port to metadata of an application level protocol;
combining the metadata and the datagram;
serializing, by the computing device, the combined metadata and datagram according to a serialization format; and
sending, by the computing device, the serialized, combined metadata and datagram to the target server over NIDD-based transport.

16. The method of claim 15, comprising:
wrapping the NIDD socket in a wrapper socket to emulate handling of Internet Protocol (IP)-based transport.

17. The method of claim 15, wherein the datagram is an encrypted datagram generated when the DTLS handshake process has been completed and is an unencrypted application protocol data.

18. The method of claim 15, wherein the application-level protocol comprises at least one of Constrained Application Protocol (CoAP), light weight machine-to-machine (LwM2M) protocol, MQ Telemetry Transport for Sensor Networks (MQTT-SN) protocol, and Quick User Datagram Protocol Internet Connections (QUIC) protocol.

19. The method of claim 15, wherein a serializing format for the serialized envelop is Concise Binary Object Representation (CBOR).

20. The method of claim 15, wherein the NIDD socket is a listening socket.

\* \* \* \* \*